(12) United States Patent
Terhaar et al.

(10) Patent No.: US 7,748,767 B2
(45) Date of Patent: Jul. 6, 2010

(54) HINGE ASSEMBLY

(75) Inventors: David L. Terhaar, Allegan, MI (US); David J. Terhaar, Holland, MI (US)

(73) Assignee: Industrial Machining Services, Inc., Zeeland, MI (US)

( * ) Notice: Subject to any disclaimer, the term of this patent is extended or adjusted under 35 U.S.C. 154(b) by 103 days.

(21) Appl. No.: 11/982,143

(22) Filed: Nov. 1, 2007

(65) Prior Publication Data
US 2008/0100087 A1 May 1, 2008

Related U.S. Application Data

(60) Provisional application No. 60/855,778, filed on Nov. 1, 2006.

(51) Int. Cl.
*B60P 7/02* (2006.01)

(52) U.S. Cl. .......................... 296/100.06; 296/136.03; 16/231; 16/232; 16/366

(58) Field of Classification Search ............ 296/136.03, 296/100.06, 100.07, 193.08, 181.7, 26.01, 296/53, 52, 59, 76; 16/254, 366, 370, 357, 16/360, 231, 232; 49/394
See application file for complete search history.

(56) References Cited

U.S. PATENT DOCUMENTS

| | | | | |
|---|---|---|---|---|
| 3,682,348 A * | 8/1972 | Roberts | ....................... | 16/343 |
| 4,324,429 A * | 4/1982 | Wilson et al. | ............. | 296/100.1 |
| 4,861,092 A * | 8/1989 | Bogard | ................... | 296/100.09 |
| 5,898,977 A * | 5/1999 | Muir | ............................ | 16/363 |
| 6,230,364 B1 * | 5/2001 | Cheal | .......................... | 16/289 |
| 6,309,005 B1 * | 10/2001 | Priest et al. | ............ | 296/100.06 |
| 6,447,045 B1 * | 9/2002 | Dickson et al. | ......... | 296/100.08 |
| 6,618,904 B1 * | 9/2003 | Nagy | .......................... | 16/370 |
| 6,702,360 B1 * | 3/2004 | Santos et al. | ............ | 296/100.07 |
| 7,066,523 B2 * | 6/2006 | Verduci et al. | ......... | 296/100.06 |
| 2005/0188505 A1 * | 9/2005 | Bennett | ....................... | 16/366 |
| 2005/0223524 A1 * | 10/2005 | Muir | ............................ | 16/366 |
| 2007/0096499 A1 * | 5/2007 | Zajicek et al. | ......... | 296/100.06 |

* cited by examiner

*Primary Examiner*—Patricia L Engle
*Assistant Examiner*—SunSurraye Westbrook
(74) *Attorney, Agent, or Firm*—Flynn, Thiel, Boutell & Tanis, P.C.

(57) ABSTRACT

A tonneau cover is mounted to the cargo area of a pickup truck by a hinge mechanism positioned at the forward end of the pickup truck cargo area. The hinge assembly has two major components. The first component is a mounting plate that is affixed to each sidewall of the cargo area near the forward extent of the cargo area. The mounting plate includes an alignment mechanism and a mechanism for clamping the second component onto the mounting plate. The base plate also includes slots for engagement by the clamping mechanism of the mounting plate. The articulating mechanism is configured to open the tonneau cover in a nearly vertical direction initially, prior to rotation of the tonneau cover to an open position. An installer can reach in from the side of the truck cargo area and engage the clamps to secure the removable component to the mounting plate.

11 Claims, 9 Drawing Sheets

US 7,748,767 B2

HINGE ASSEMBLY

CROSS-REFERENCE TO RELATED APPLICATIONS

This application claims the benefit of U.S. Provisional Application Ser. No. 60/855,778, entitled Hinge Assembly, and filed Nov. 1, 2006.

FIELD OF THE INVENTION

The invention relates to hinge assemblies, particularly hinge assemblies for motor vehicle applications. More specifically, the invention is related to a hinge assembly for a tonneau cover for a vehicle cargo area.

BACKGROUND OF THE INVENTION

In a motor vehicle having an open cargo area, i.e. a pickup truck, it is well known to provide a cover to protect the cargo area from weather, and to protect the contents of the cargo area from theft. The cover of the cargo area is known to take the form of a raised cap that generally follows the lines of the cab of the pickup truck. The cap provides the advantage of a higher clearance for larger cargo, but is generally permanently attached to the sidewalls of the cargo area, or is relatively heavy and bulky, precluding easy removal and storage.

The cover is also known to take the form of a tonneau cover that closely conforms to the top of the sidewalls of the cargo area, or bed, of the truck. Tonneau covers can take several forms. The tonneau cover can be formed from a fabric, with the fabric attached to the sidewalls and the front and end walls of the cargo area, with the central area of the tonneau cover supported by flexible ribs spanning the cargo area in a transverse direction. This tonneau cover embodiment has the advantage of being easily removable, and it does not take up much storage room when it is removed from the cargo area. The disadvantage to this type of tonneau cover is that it is easy for unauthorized persons to gain access to the cargo area.

A second type of tonneau cover is a rigid or hard flat shell formed of fiber glass or other composite materials. This second type of tonneau cover is generally attached to the cargo area by hinges positioned at the front end of the cargo area so that the tonneau cover can be raised while loading the cargo area, and then lowered and locked to secure the cargo. Due to the weight of this type of tonneau cover, the system generally also includes a pneumatic or hydraulic cylinder mechanism, or other spring biasing means to assist in the opening of the cover. A lock mechanism is generally placed at the rear end of the cargo area to secure the tonneau cover in the closed position. The advantage of this type of tonneau cover over the fabric tonneau cover is that the cargo can be secured against unauthorized access. A further advantage of the hard tonneau cover over the truck cap is that it is generally lighter and requires less storage space when not mounted on the cargo area. However, a disadvantage of the hard tonneau cover over the truck cap is that there is less available cargo room, and a lower clearance, when the tonneau cover is in the closed position. A further disadvantage of the hard tonneau cover according to the prior art is that removal of the tonneau cover generally requires dismounting of the tonneau cover and the hinge assembly from the cargo area, which requires the user to climb into the truck cargo area under the closed tonneau cover to detach the hinges so that the hard tonneau cover can be lifted from the truck cargo area.

In view of the foregoing, it is an object of the invention to provide a tonneau cover hinge assembly that would enable a user to quickly and easily align the tonneau cover for installation on a truck cargo area, or removal from the cargo area, and that would not require the user to crawl into the truck cargo area in order to secure the tonneau cover once installed and in the closed position.

SUMMARY OF THE INVENTION

According to the invention, an inventive hinge assembly for a tonneau cover includes a mounting plate that is installed in a truck cargo area. The mounting plate is configured to receive a removable component attached to a tonneau cover for removably securing the tonneau cover to the truck cargo area, and overcoming the disadvantages associated with known tonneau covers.

Other objects and purposes of the invention will be apparent to persons familiar with arrangements of this general type upon reading the following specification and inspecting the accompanying drawings.

Figure 1:
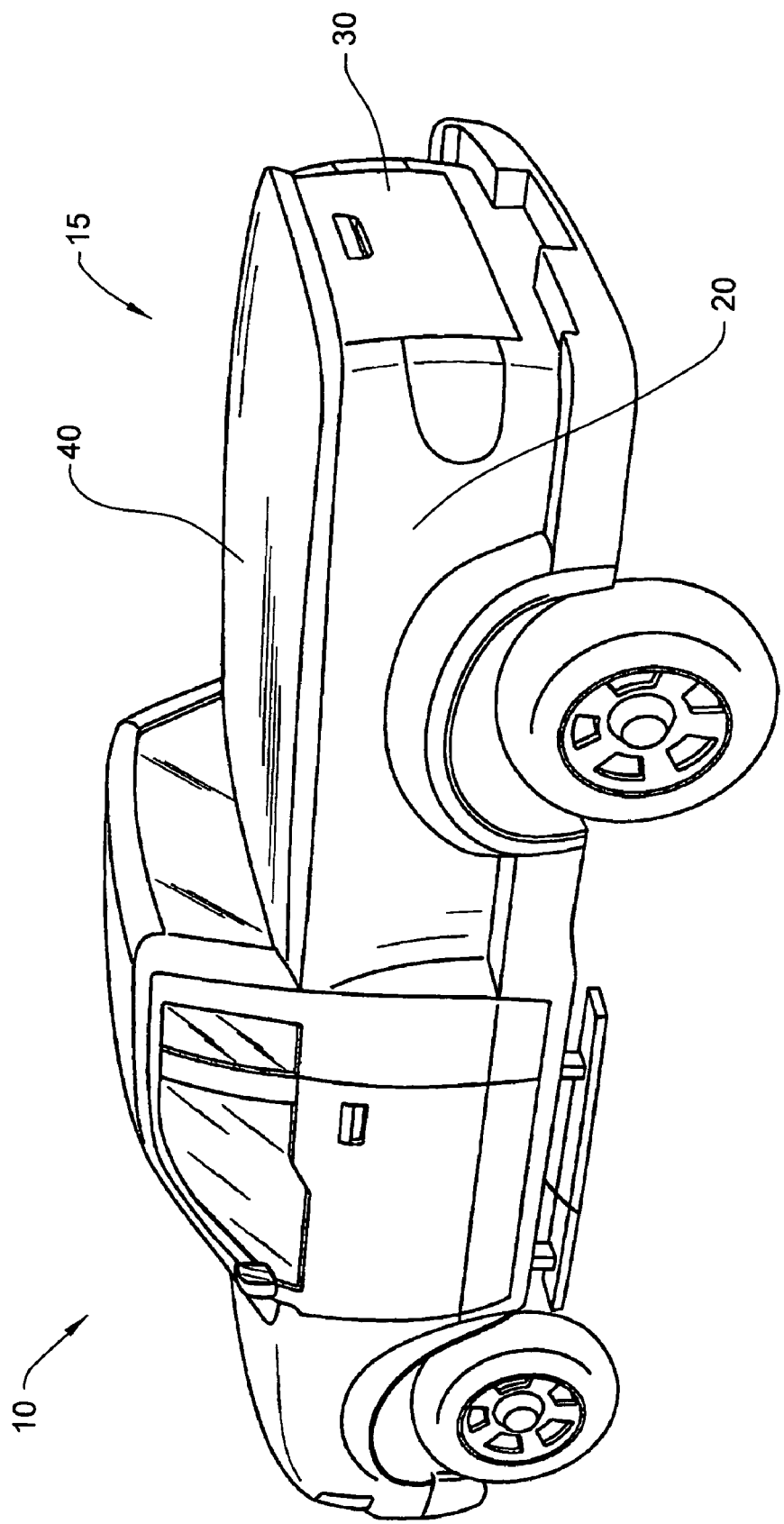
FIG. 1 is a perspective view of a pickup truck with a tonneau cover in the closed position.

Certain terminology will be used in the following description for convenience in reference only and will not be limiting. The words "up" and "down", "right" and "left" will designate directions in the drawings to which reference is made. The words "in" and "out" will refer to directions toward and away from, respectively, the geometric center of the hinge assembly and designated parts thereof. The words "forward" and "rearward" will refer to the directions toward the front and rear of a truck cargo area, respectively. Such terminology will include derivatives and words of similar import. The following description of a hinge will generally be referring to a hinge mounted proximate a right-hand sidewall of a truck cargo area, and to a mirror image of the described hinge that is mountable proximate an opposing sidewall of the truck cargo area.

DETAILED DESCRIPTION

Figure 2:
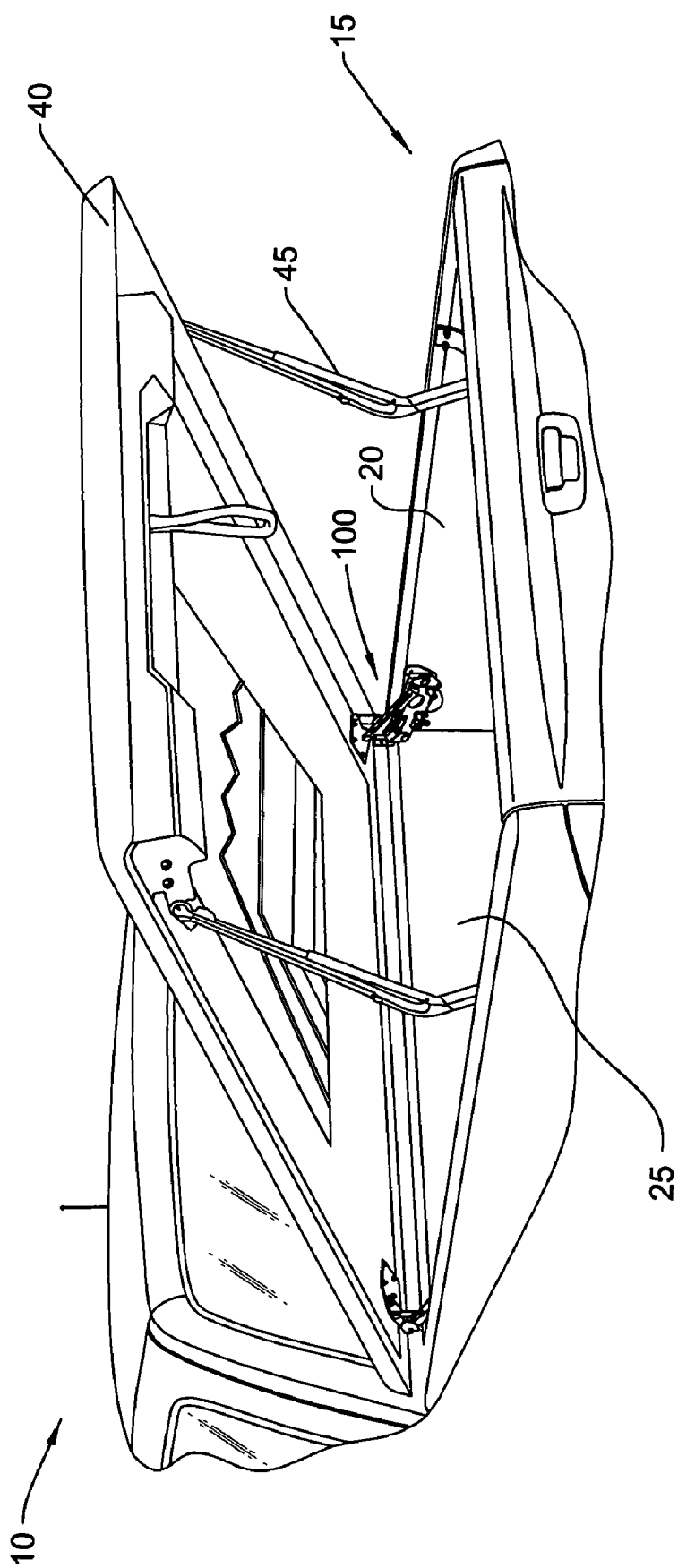
FIG. 2 is a partial perspective view of a pickup truck with a tonneau cover in the open position.

Referring to FIGS. 1-2, a motor vehicle such as a pickup truck 10 has a cargo area 15 in the form of a bed. The cargo area or bed 15 has sidewalls 20 running longitudinally on the vehicle 10, a forward wall 25 (see also FIG. 8) and a tailgate 30. A tonneau cover 40 is pivotally mounted over the cargo area 15 by a hinge assembly 100 mounted to each of the sidewalls 20.

Referring to FIGS. 3-6, the hinge assembly 100 includes a fixed mounting plate 110 and a removable hinge component 120.

The removable hinge component 120 is secured to the plate 110 by T-handle clamps 130, 135 having sliding T-handles 132, 137 respectively, which T-handles 132, 137 are shaped as pins and are slidable through the clamp body like a vise handle. The T-handles 132, 137 can thus be moved to one side or the other so as to provide optimal leverage or to maneuver around obstacles. Each clamp 130, 135 further includes a nut portion 134, 139 (FIG. 5) on the end thereof for accepting a tool.

Figure 3:
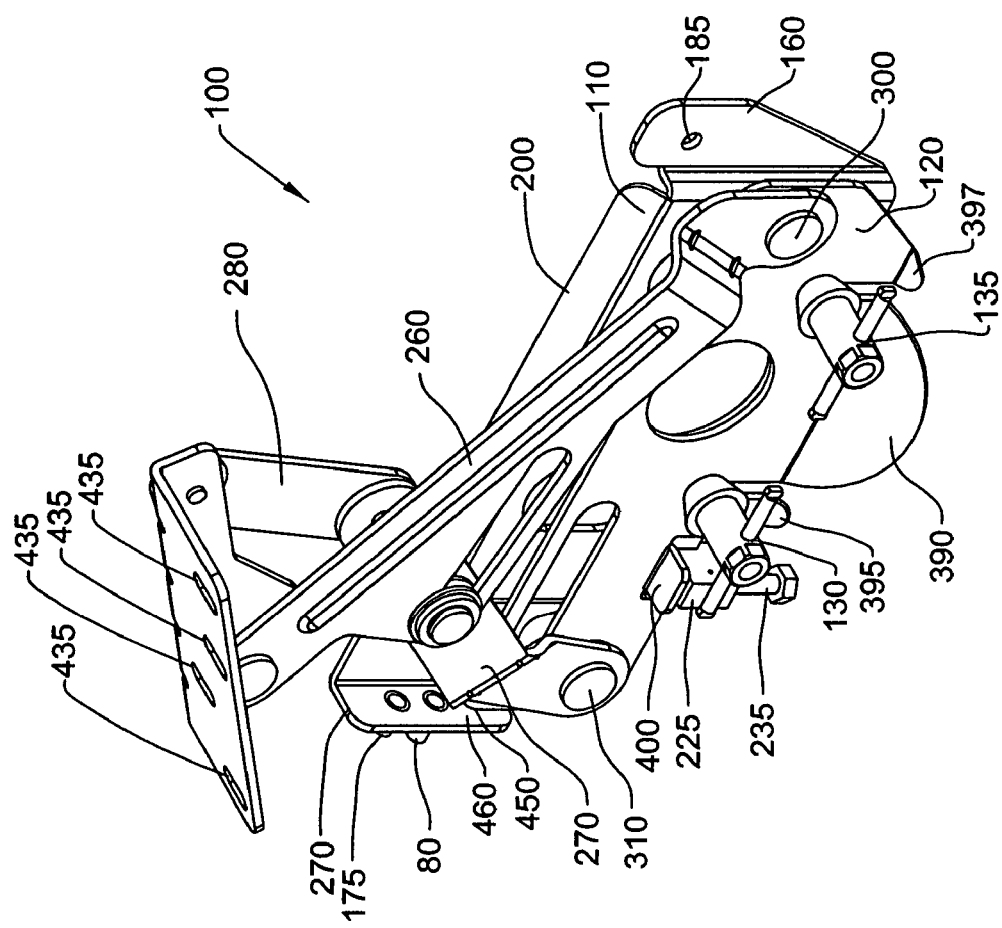
FIG. 3 is a perspective view of a hinge assembly according to the invention.
Figure 4:
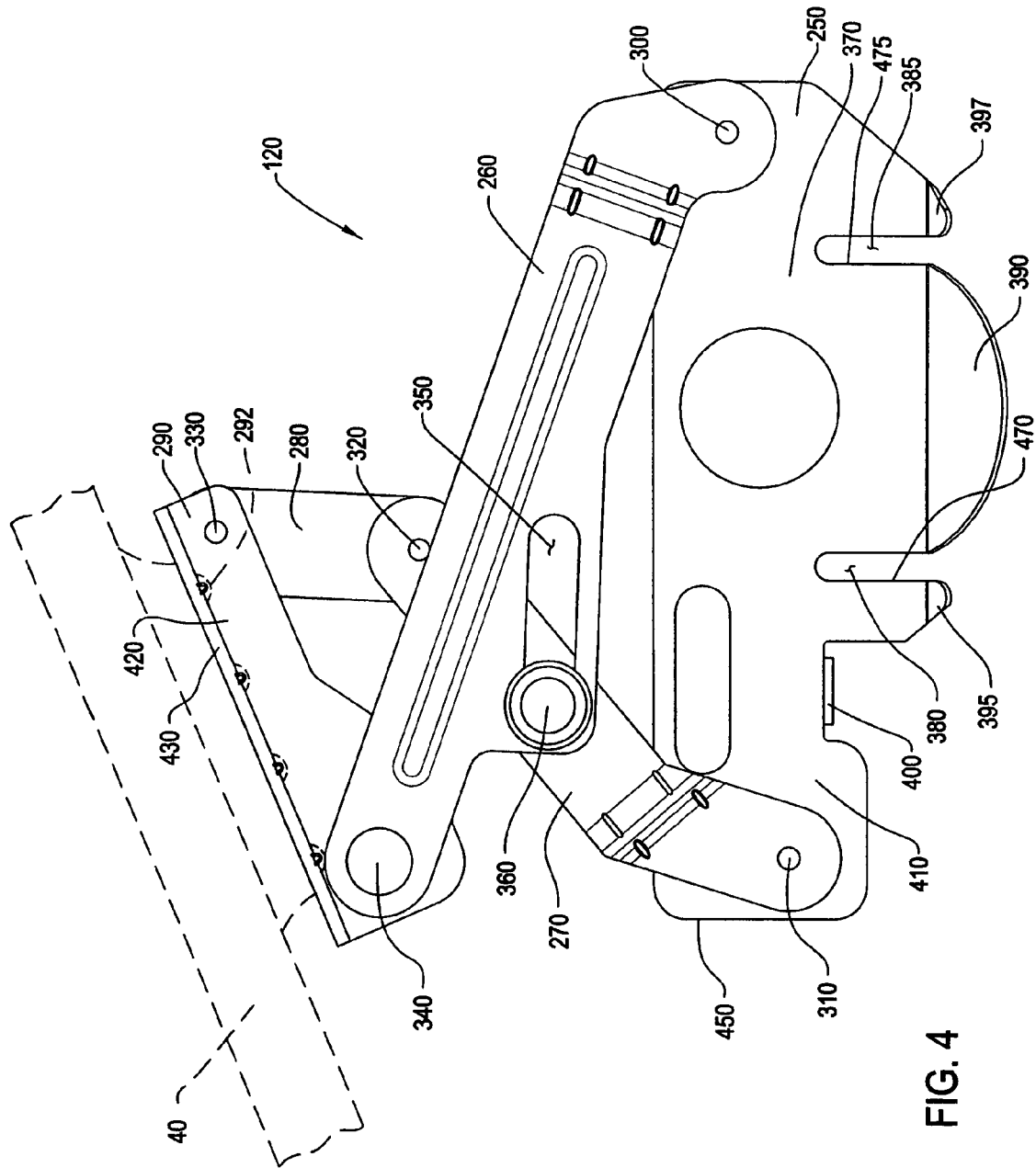
FIG. 4 is a side view of a removable component of the hinge assembly of FIG. 1.
Figure 5:
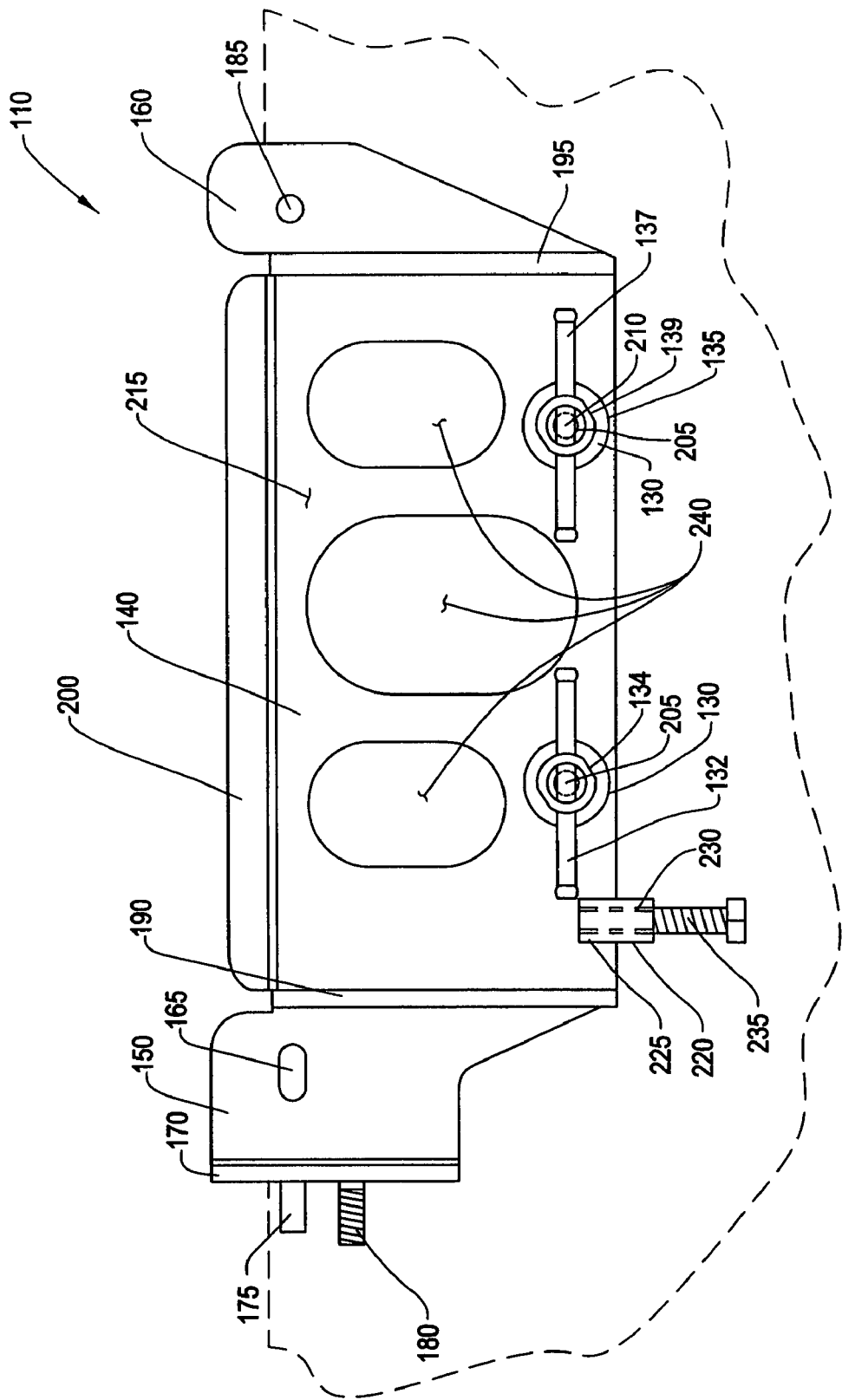
FIG. 5 is a side view of a mounting plate of the hinge assembly of FIGS. 1-2.

Referring to FIG. 5, the plate 110 includes a center section 140, a forward section 150, which would be located nearest the cab, and a rearward section 160, which would be located nearest the tailgate. The forward section 150 includes an aperture 165 for receiving a fastener 167 (FIG. 6) for securing the plate 110 to the sidewall 20 of the cargo area or to an accessory mounting rail secured to the sidewall 20 of the cargo area 15 for this purpose. As seen in FIGS. 3 and 4, the forward section 150 further includes a flange 170 extending perpendicularly and inwardly relative to the forward section 150. An alignment stud 175 and a threaded stud 180 project forwardly from the flange 170.

Figure 6:
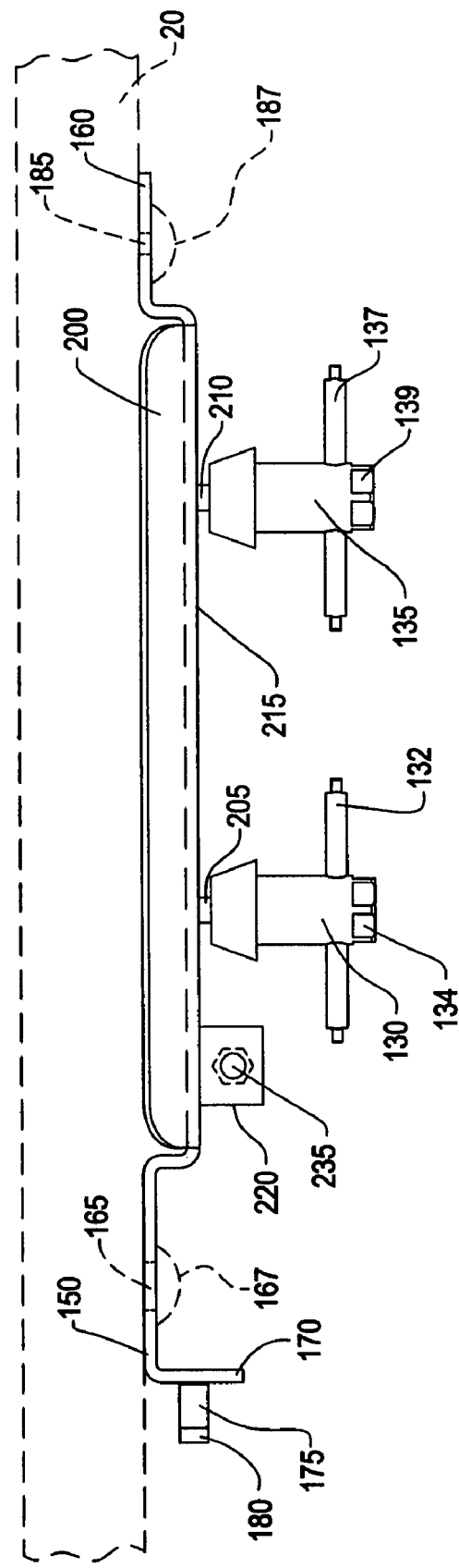
FIG. 6 is a plan view of the mounting plate of FIG. 3.

The rearward section 160 includes an aperture 185 for receiving a fastener 187 (FIG. 6) to secure the plate 110 to the cargo area sidewall 20 or the accessory mounting rail. Each of the forward section 150 and the rearward section 160 are parallel to the center section 140, but are offset outwardly from the center section 140 by transition portions 190, 195 respectively. By this arrangement, when the plate 110 is mounted to the cargo area sidewall 20, forward section 150 and rearward section 160 will be flush against the sidewall, but center section 140 will be parallel to but spaced away from the cargo area sidewall as seen in FIG. 6.

Center section 140 of plate 110 includes an upper beveled flange 200. The beveled flange 200 forms an angle with the center section 140 in the direction of the cargo area sidewall whereby the top of the beveled flange 200 is approximately coplanar with inside faces of the forward section 150 and the rearward section 160, so as to lie flush against the cargo area sidewall.

A pair of threaded studs 205, 210 (FIGS. 5 and 6) extend from the front face 215 of the center section 140, and the clamps 130, 135 are threadably received thereon. As will be described hereinafter, the hinge component 120 removably seats on the studs 205, 210 and the clamps 130, 135 affix the hinge component 120 in position when tightened.

To align the hinge component 120 vertically, a vertical alignment assembly 220 is attached to the front face 215 of the center section 140 and includes a block 225 having a threaded through aperture 230 receiving a threaded drive bolt 235 which is vertically displaceable by rotation thereof and abuts upwardly against the hinge component 120 to control the vertical position thereof during installation. The center section 140 also includes a number of cutout portions or windows 240 for the purpose of weight reduction.

Turning next to the hinge component 120, this hinge component 120 is removably affixed to the mounting plate 110 so as to be stationarily mounted on the upper edge of the truck sidewall proximate the cab. The hinge component 120 in turn is affixed to the front end 50 of the tonneau cover 40 to control tilting thereof. In particular, the left and right hinge assemblies 100 together define a pivot axis extending horizontally across the truck bed and about which the tonneau cover 40 pivots between the lowered, closed position and the raised, open position.

More particularly referring to FIGS. 3 and 4, the removable hinge component 120 includes a base plate 250, a first pivot arm 260, a second pivot arm 270, a third pivot arm 280 and a cover bracket 290. The first pivot arm 260 is pivotally attached to the base plate 250 by a pin 300, and the second arm 270 is pivotally attached to the base plate 250 by a pin 310. Furthermore, the second arm 270 is pivotally attached to the third arm 280 by a pin 320, and the third arm 280 in turn is pivotally attached to the bracket 290 by a pin 330. The first arm 260 is pivotally attached to the bracket 290 by a pin 340. The first arm 260 includes a slot 350. A pin 360 mounted to the second arm 270 is slideably received in the slot 350 to form a linkage between the first arm 260 and the second arm 270. The first through third pivot arms 260, 270, 280 and the bracket 290 form an articulated link mechanism.

With this link mechanism, the bracket 290 is thereby forced to articulate in a specific, controlled fashion so that the forward edge of the tonneau cover will lift vertically from a seal on the forward edge of the cargo area. As the tonneau cover continues to rise, the forward edge of the tonneau cover will undergo minimal rearward movement. By minimizing rearward movement, debris, such as leaves, snow or dirt, will be dislodged from the tonneau cover and will fall outside of the cargo area.

As to the base plate 250 which pivotally supports the link mechanism, the base plate 250 includes a central portion 370, which includes a pair of parallel vertical slots 380, 385 which are adapted to slide onto the above-described studs 205, 210 of the mounting plate 110.

The lower portion of the base plate 250 is bent inwardly in the form of inwardly directed flanges 390, 395, 397 which are separated by the slots 380, 385. The flanges 390, 395, 397 form an angle with the plane of the central portion 370 of the base plate 250 and extend inwardly with respect to the sidewall into the cargo area.

The base plate 250 further includes an alignment flange 400 extending perpendicularly from the face 410 of the base plate 250, and positioned to line up with the alignment assembly 220 of the mounting plate 110. When the hinge component 120 is assembled onto the mounting plate 110, the alignment assembly 220 and alignment flange 400 will set the height of the hinge component 120 relative to the mounting plate 110.

As to the bracket 290 for the tonneau cover, the cover bracket 290 includes a lower portion 420 that is pivotally attached to the first arm 260 and the third arm 280. An upper portion 430 of the bracket 290 is formed perpendicular to the lower portion 420. The upper portion 430 includes a plurality of apertures 435 for receiving fasteners for attachment to the tonneau cover.

Figure 7:
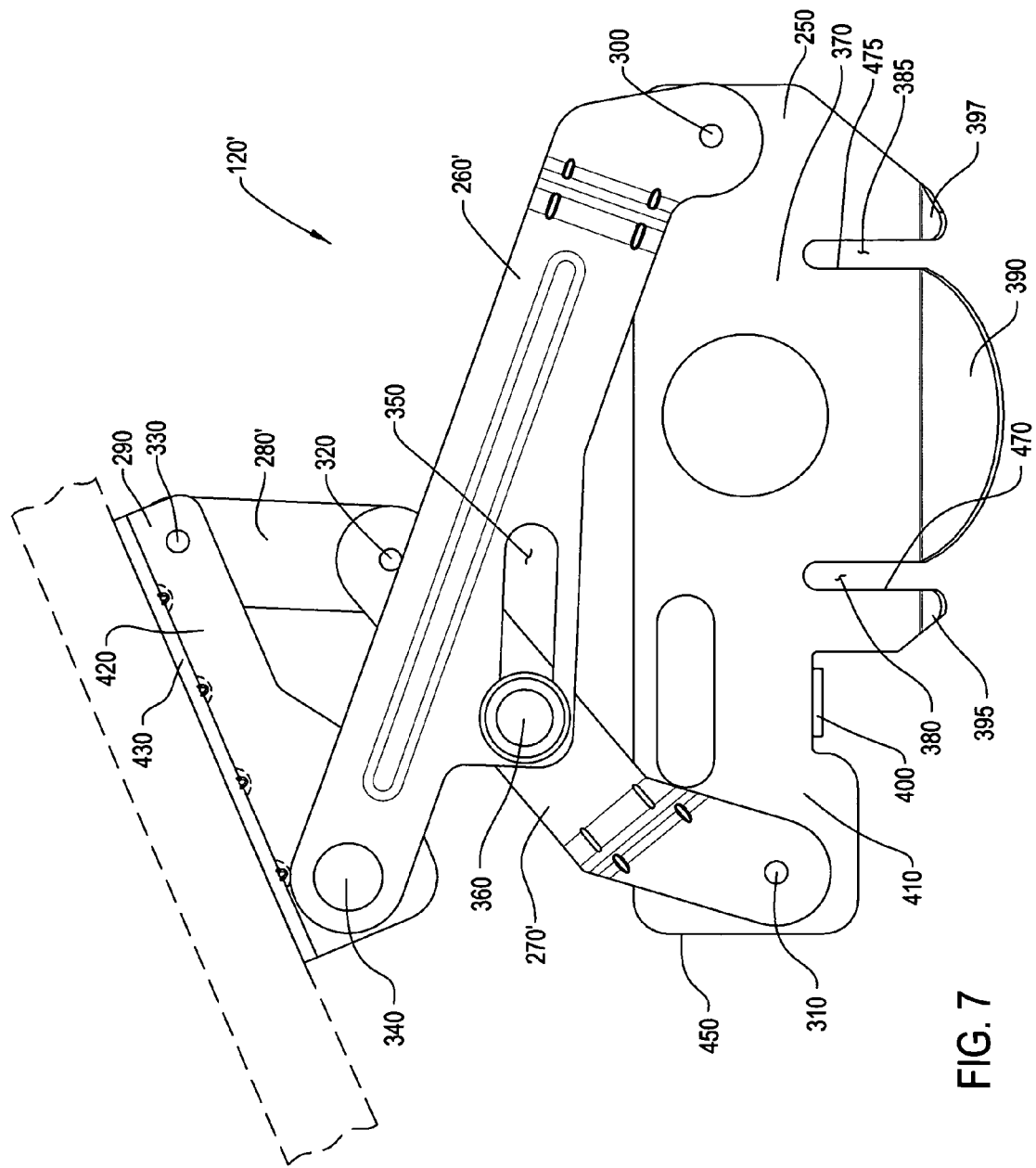
FIG. 7 is a side view of a further embodiment of a removable component of a hinge assembly according to the invention.

Referring to FIG. 7, in a further embodiment of the removable component 120', the dimensions of the removable component 120', specifically those of the arms 260', 270', and 280', are adjusted so that the maximum rotation of the cover bracket 290 is increased. By increasing the overall degree of rotation of the hinge assembly 100, a tonneau cover 40, for use in a truck 10 having a cargo area 15 with a shorter length, can be rotated sufficiently to allow clearance for entry into the truck cargo area 15. The shorter length of the tonneau cover 40 requires a greater degree of rotation to create the same amount of vertical clearance at the tailgate 30 of the cargo area 15.

The remaining elements of the removable component 120', namely the base plate 250 and the cover bracket 290, are the same as in the first embodiment of the removable component 120. It should also be noted that the hinge assembly 100 is also adaptable to tonneau covers 40 having either a low or high profile relative to the top of the sidewalls 20 of the cargo area 15.

Figure 8:
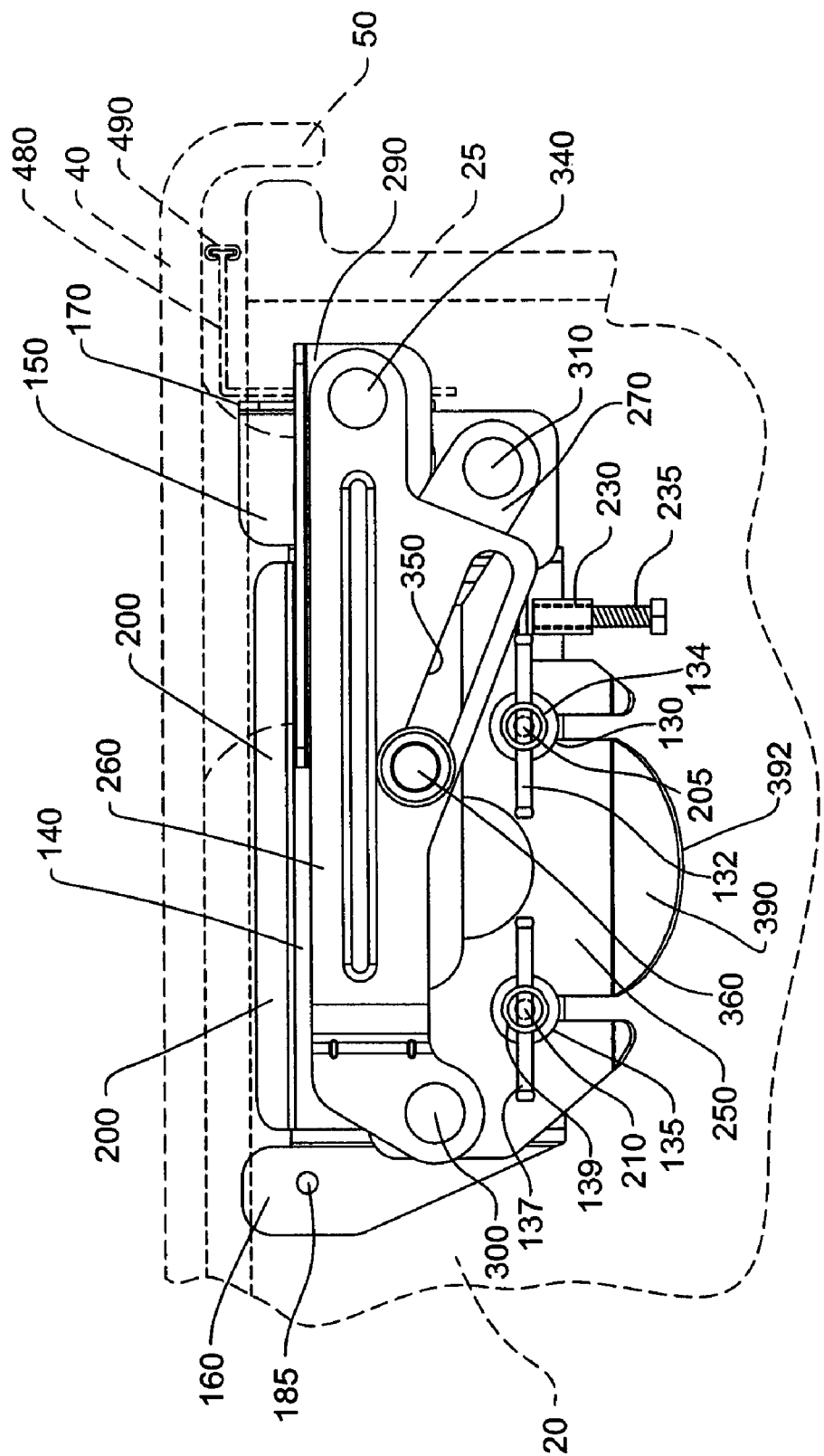
FIG. 8 is an installed side view of the hinge assembly according to the invention in the closed position.
Figure 9:
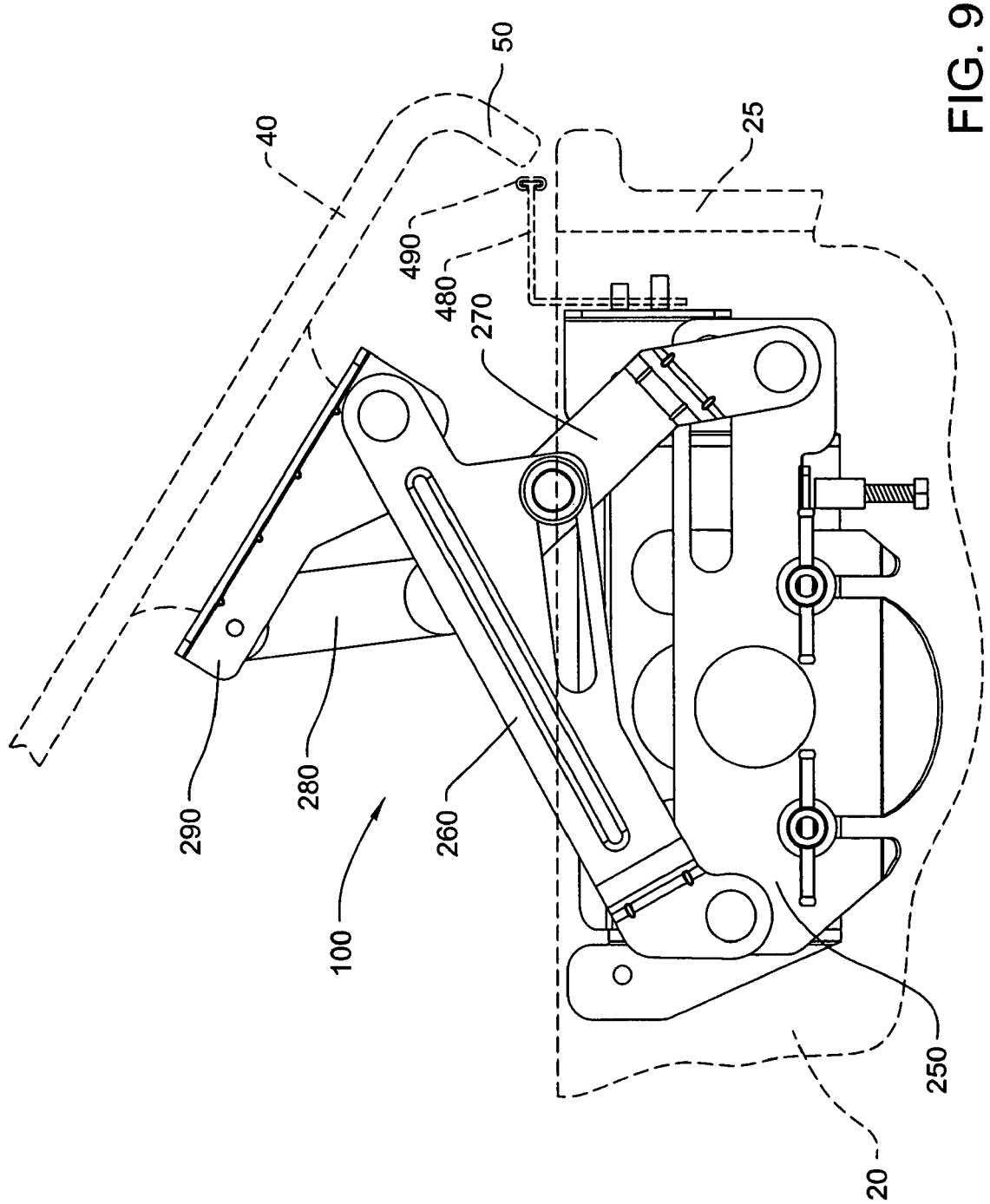
FIG. 9 is an installed side view of the hinge assembly according to the invention in the open position.

As shown in the FIGS. 8-9, an L-shaped bracket 480 is attached to the alignment stud 175 and the threaded stud 180. The L-shaped bracket 480 is configured for holding a seal 490 over the front wall 25 of the truck cargo area 15 for engagement of the tonneau cover 40.

Operation

During installation on a vehicle, the mounting plate 110 for each of the left and right hinge assemblies 100 is attached to a pre-designated location on the sidewall or accessory mounting rail of the truck cargo area, preferably near the cab. The clamps 130, 135 are loosened to their outermost extent to provide clearance for the flanges 390, 395, 397 of the base plate 250 of the hinge component 120.

The removable hinge component 120 is first mounted to the tonneau cover by a plurality of fasteners 292 (FIG. 4) passing through the apertures 435 in the bracket 290. The tonneau cover is then lowered over the truck cargo area so that the slots 380, 385 in each removable component 120 are aligned with the threaded pins 205, 210 extending from the back plate 140 of the mounting plate 110. Transverse alignment of the tonneau cover relative to the sidewalls of the cargo area is facilitated as the flanges 390, 395, 397 interact with the upper beveled flange 200 of the mounting plate 140.

Forward and rearward alignment of the removable hinge component 120 is facilitated by the curved surface 392 of the flange 390, wherein the flange 390 passes between the studs 205, 210, and the curved surface 392 can slide along the pins 205, 210 to align the slots 380, 385 of the hinge component 120 with their respective studs 205, 210.

Upon initial installation of the hinge assembly 100 in the cargo area, the threaded fastener 235 on the mounting plate 110 is adjusted, i.e. rotated, to engage the flange 400 extending perpendicularly from the face 410 of the plate 250. The tonneau cover is set at the appropriate height relative to the cargo area sidewalls 20 with the fastener 235 brought up to engage or contact the flange 400. Once the correct height is set for the removable component 120, with respect to the moving plate 110, the threaded fastener 235 is prevented from further movement. A dimple is pressed into the side of the block 220, thereby forming an interference thread to resist unforced rotation of the fastener 235. With the position of the removable components 120 set on each side of the cargo area 15, an even mounting of the tonneau cover 40 on the cargo area 15, and an even engagement of the tonneau cover 40 with a perimeter seal of the truck cargo area 15, is ensured.

Once this vertical adjustment is set, the clamps 130, 135 can be tightened to lock the removable component 120 on the mounting plate 110. The clamps 130, 135 can be tightened by hand, without the use of tools, or can accept a tool on the nut portions 134, 139.

For subsequent installations of the tonneau cover, the tonneau cover is lowered vertically onto the truck cargo area. As the tonneau cover is lowered, the removable components 120 on the left and right sides of the truck cargo area align with and engage over the mounting plates 110. The tonneau cover is capable of being installed and removed only in a vertical direction as the slots 380, 385 receive the studs 205, 210 extending from the mounting plate 110, and only before the clamps 130, 135 are secured.

It is noted that even when the clamps 130, 135 are not yet tightened, the hinge component 120 and mounting plate 110 are still operable. According to the prior art, securement of a hinge assembly to a fixed component would require an individual to climb into the cargo area underneath the closed tonneau cover, and secure the removable component to the fixed component before the cover was operable. According to the invention, however, the tonneau cover 40 is capable of being opened from the rear end of the truck cargo area 15 under the operation of the hinge assembly 100 even when the clamps 130, 135 are not tightened. As the rearward end of the tonneau cover is lifted, a rotating moment is imposed upon the removable component 120 by the rotating cover, which would tend to rotate the removable component 120 in a counterclockwise direction (as shown in FIG. 1) relative to the mounting plate 110. However, the removable component 120 cooperates with or abuts against portions of the mounting plate 110 to prevent rotation. As the rotating moment acts on the removable component 120 during lifting of the cover, a forward edge 450 of the plate 250 bears against the rearward face 460 of the flange 170. Simultaneously, the threaded studs 205, 210, projecting from the back plate 140, bind against the forward edges 470, 475 (see FIG. 4) of the slots 380, 385, respectively, of the plate 250. This binding force counteracts the rotating moment exerted by the tonneau cover 40 on the hinge component 120 and prevents relative rotation or shifting of the base plate 250 of the hinge component 120 with respect to the mounting plate 110, even with the clamps 130, 135 being loose. As a result, the rotating moment rotates the cover bracket 290 relative to the base plate 250, through the arms 260, 270, 280 and the hinge assembly 100 moves from the closed position (FIG. 8) to the open position (FIG. 9).

As the tonneau cover 40 is raised from the closed position to the open position, the hinge assembly 100 initially extends in a substantially vertical direction until the front lip 50 of the tonneau cover clears the front wall 25 of the cargo area 15. Then, as the hinge assembly 100 continues to extend while raising the tonneau cover 40, the front lip 50 of the tonneau cover 40 remains outside of the truck cargo area 15 until there is sufficient inclination of the tonneau cover 40 to dislodge any foreign matter that may be deposited thereon, such as leaves, snow, water or dirt. This prevents the foreign matter from entering the cargo area.

With the hinge assembly 100 in the open position of FIG. 9, an installer of the tonneau cover 40 can reach in from outside of the cargo area to operate the clamps 130, 135 to secure the removable component 120 to the mounting plate 110. This is done after the lifting force on the tonneau cover is eased sufficiently to allow the removable component 120 to sit squarely on the mounting plate 110. With the tonneau cover held in the open position, the installer can also attach a spring lift mechanism 45 to assist in further operation of the tonneau cover 40.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A hinge assembly for a closure, comprising:
a mounting plate; and
a removable component having a base plate, first and second articulating arms pivotally mounted to the base plate, a third arm, and a cover bracket for mounting to a closure, the first and second arms being further pivotally connected to the bracket;
wherein the first arm includes a lower end that is pivotally connected to a rearward portion of the base plate, an upper end that is pivotally connected to a forward portion of the cover bracket, and a center portion including a slot, the slot positioned between the lower end and the upper end of the first arm;

the second arm includes a lower end pivotally connected to a forward portion of the base plate, and an upper end;

the third arm includes an upper end pivotally connected to a rearward portion of the cover bracket and a lower end pivotally connected to the upper end of the second arm;

the second arm further including a center portion, with a connector fixedly attached to said second arm center portion and slidably received in said slot in said center portion of said first arm.

2. The hinge assembly of claim 1, wherein the mounting plate comprises a first planar portion and first and second projections, the first planar portion including a face, and the first and second projections extending from the face of the first planar portion.

3. The hinge assembly of claim 2, wherein the removable component further includes at least two apertures each sized to receive one of the first and second projections, such that the removable component can be fixedly removably attached to the mounting plate and the mounting plate opposes a rotating movement exerted by the removable component.

4. The hinge assembly of claim 1, wherein the slot has a first end and a second end, the first and second articulating areas intersecting in a transverse relation when the connector is slid to the second end of the slot.

5. A cover assembly comprising:
a cover for covering a storage space, the cover having a terminal front portion residing at an initial predetermined forward location when the cover is in a lowered position;
a hinge comprising a base plate, and at least three articulating arms controlling movement of the cover from the lowered position to a raised position in which the cover is inclined relative to the lowered position, at least one of which is pivotally mounted to the base plate; and
a cover bracket, the cover bracket being attached to the cover, at least one of the articulating arms pivotally mounted to the cover bracket;
the articulating arms arranged with respect to each other and the cover bracket that when the cover is in the raised position, the cover front portion substantially maintains the same forward location as the initial predetermined forward location.

6. The cover assembly of claim 5, wherein at least two of the three articulating arms intersect each other in transverse relation when the cover is in the raised position.

7. The cover assembly of claim 5, wherein one of the at least three articulating arms is oriented at an angle with respect to the second articulating arm so as to maintain the initial predetermined forward location of the front portion of the cover when the cover is in the raised position.

8. The cover assembly of claim 5, the hinge further including a base plate having a flange with an angled portion extending sidewardly from the base plate, the angled portion of the flange disposed to facilitate sideward alignment of the cover assembly when mounting the hinge to an object.

9. A hinge assembly comprising:
a mounting bracket having a face, a first projection, and a second projection, the first and second projections extending from the mounting bracket face and adapted to alternately reside at an inward position and an outward position respectively disposed toward and away from the face;
a removable component for engagement with the mounting bracket, the removable component having a face plate, at least one recess in the face plate for receiving the first and second projections, and a flange extending outwardly from the face plate, the flange sized to interfere with at least one of the mounting bracket projections when the removable component is engaged with the mounting bracket and at least one of the mounting bracket projections is residing in the inward position; and
articulating links attached to the removable component, and attachable to a cover to control movement of an attached cover between raised and lowered positions.

10. The hinge assembly of claim 9, wherein the flange includes a curved portion for easy alignment of the removable component with the mounting bracket.

11. A hinge assembly comprising:
a mounting bracket having a face, a leading bracket edge, at least one fastener projection extending outwardly from the face, and a vertically-extending and outwardly-projecting lateral flange attached to the leading bracket edge of the mounting bracket;
a removable component having a face plate with at least one recess for vertically receiving the at least one mounting bracket fastener projection for securing the face plate to the mounting bracket, the face plate having a vertically-extending leading plate edge that resides adjacent the lateral flange of the mounting bracket when the at least one projection is received in the at least one recess, the leading plate edge and the lateral flange having respective opposing faces which are freely slidable to permit vertical displacement of the face plate relative to the mounting bracket while preventing the vertical displacement when the removable component is subject to a lifting rotating moment; and
at least three articulating arms at least one of which is attachable to a cover to control movement of an attached cover between raised and lowered positions, and at least one of the articulating arms being connected to the removable component.

* * * * *